US009532395B2

(12) United States Patent
Wang et al.

(10) Patent No.: US 9,532,395 B2
(45) Date of Patent: Dec. 27, 2016

(54) SYSTEM AND METHOD FOR DEVICE TO DEVICE (D2D) COMMUNICATION

(71) Applicant: China Academy of Telecommunications Technology, Beijing (CN)

(72) Inventors: Ying Wang, Beijing (CN); Bin Jiao, Beijing (CN); Aijuan Liu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 37 days.

(21) Appl. No.: 14/419,801

(22) PCT Filed: Jul. 30, 2013

(86) PCT No.: PCT/CN2013/080386
§ 371 (c)(1),
(2) Date: Feb. 5, 2015

(87) PCT Pub. No.: WO2014/023173
PCT Pub. Date: Feb. 13, 2014

(65) Prior Publication Data
US 2015/0201452 A1 Jul. 16, 2015

(30) Foreign Application Priority Data
Aug. 8, 2012 (CN) .......................... 2012 1 0281091

(51) Int. Cl.
H04B 7/00 (2006.01)
H04W 76/04 (2009.01)
(Continued)

(52) U.S. Cl.
CPC ........... H04W 76/043 (2013.01); H04W 8/005 (2013.01); H04W 48/16 (2013.01);
(Continued)

(58) Field of Classification Search
CPC ...... H04W 48/02; H04W 12/04; H04W 12/06; H04W 12/08; H04W 28/0236; H04W 28/10; H04W 36/0066; H04W 36/0083; H04W 36/10; H04W 36/30; H04W 36/38; H04W 40/12; H04W 48/06; H04W 48/16; H04W 48/17
(Continued)

(56) References Cited

U.S. PATENT DOCUMENTS 5,749,044 A * 5/1998 Natarajan .......... H04B 7/18539
455/12.1
2011/0019644 A1 1/2011 Cheon et al.
2012/0179789 A1* 7/2012 Griot ..................... H04W 12/08
709/220

FOREIGN PATENT DOCUMENTS

CN 101227726 A 7/2008
CN 102132625 7/2011
(Continued)

OTHER PUBLICATIONS

Extended European Search Report for European Patent Application No. 13827741.3, mailed Nov. 16, 2015.
(Continued)

Primary Examiner — Ronald Eisner
(74) Attorney, Agent, or Firm — Foley & Lardner LLP; James F. Ewing; Paul M. H. Pua

(57) ABSTRACT

Disclosed are a terminal control method and device, used for implementing control on a user equipment (UE) with a proximity perception capability when a D2D communication mechanism for mutual discovery even direct communication between mobile devices is introduced to a network. The method is: an MME receiving a D2D request message of a UE that is sent by a base station, determining requested D2D characteristics according to the D2D request message, determining an acceptable D2D characteristic in the
(Continued)

requested D2D characteristics, and sending the accepted D2D characteristic to the base station; and after receiving the accepted D2D characteristic returned by the MME, the base station determining whether to accept the D2D request of the UE, and if yes, the base station performing resource configuration and instructing the UE to perform the accepted D2D characteristic; otherwise, the base station rejecting the D2D request of the UE. Also disclosed are another terminal control method and device, and further disclosed is a terminal control system.

13 Claims, 8 Drawing Sheets

(51) Int. Cl.
    *H04W 8/00* (2009.01)
    *H04W 76/02* (2009.01)
    *H04W 48/16* (2009.01)
    *H04W 8/24* (2009.01)
    *H04W 76/06* (2009.01)
    *H04W 88/06* (2009.01)

(52) U.S. Cl.
    CPC ......... *H04W 76/02* (2013.01); *H04W 76/023* (2013.01); *H04W 8/24* (2013.01); *H04W 76/066* (2013.01); *H04W 88/06* (2013.01)

(58) Field of Classification Search
    USPC .......................................... 370/389, 400, 406
    See application file for complete search history.

(56) References Cited

FOREIGN PATENT DOCUMENTS

| | | |
|---|---|---|
| CN | 102165719 | 8/2011 |
| CN | 102422703 | 4/2012 |
| EP | 2866483 | 4/2015 |
| KR | 10-2009-0033088 | 4/2009 |
| KR | 10-2011-0102936 | 9/2011 |
| WO | WO-2011/039719 | 4/2011 |

OTHER PUBLICATIONS

Office Action for Korean Patent Application No. 10-2015-7006092 mailed Oct. 13, 2015 (including English summary).
International Search Report for PCT/CN2013/080386 mailed Nov. 7, 2013.

* cited by examiner

SYSTEM AND METHOD FOR DEVICE TO DEVICE (D2D) COMMUNICATION

This application is a US National Stage of International Application No. PCT/CN2013/080386,filed on Jul. 30, 2013, designating the United States, and claiming the benefit of Chinese Patent Application No. 201210281091.1, filed with the Chinese Patent Office on Aug. 8, 2012 and entitled "Method, device and system for controlling User Equipment (UE)", which is hereby incorporated by reference in its entirety.

FIELD OF THE INVENTION

The present invention relates to the field of communications and particularly to a method, device and system for controlling a User Equipment (UE).

BACKGROUND OF THE INVENTION

A mobile communication system is typically consisted of a User Equipment (UE), a radio access network and a core network. Particularly an Evolved Universal Terrestrial Radio Access Network (E-UTRAN) is a radio access system consisted of (evolved) Node B's ((e)NB's) connected with each other. An Evolved Packet Core (EPC) is a core network system, and the EPC includes a Home Subscriber Server (HSS), a Mobility Management Entity (MME) and a Gateway (GW), where the HSS is configured to store subscription data of subscribers, the MME is configured to perform mobility management on the UE, and the gateway is configured to perform functions of storing, forwarding and routing user plane data of the UE.

In a scenario where UEs communicate with each other, the UEs have to communicate with each other through relay and proxy functions available from the eNB and the gateway.

There is centralized control by the network in a Long Term Evolution (LTE) system, that is, both uplink and downlink data of a UE is transmitted and received under the control by the network, but there is no direct communication link between one UE and another, so the UEs have to communicate with each other through forwarding, and under the control, by the network and the UEs are not allowed to transmit uplink data by themselves, as illustrated in FIG. 1.

In the prior art, pure Device to Device (D2D) communication refers to direct communication between one UE and another through Bluetooth, Wireless Fidelity (WiFi), etc., over an unlicensed frequency band resource, and such D2D communication involving behaviors of subscribers themselves without being managed and controlled by a network operator can only be applied in a limited number of scenarios.

In another scheme, the D2D technology is introduced to the mobile communication operator network, and in this scheme, some direct communication is allowed between UEs so that one UE can obtain information directly from the other UE in the D2D scheme over direct communication links which can be set up under the control or assistance by the network, and D2D communication is performed between the UEs by discovering a proximate UE. As illustrated in FIG. 2, an evolved Node B (eNodeB) sets up uplink/downlink communication links respectively with a UE 1 and a UE 2 under the control by a Core Network (CN) to configure the UE 1 and the UE 2, and the two configured UEs can perform D2D communication based upon configuration information.

There has not yet been defined in the prior art a solution to controlling a UE capable of proximity awareness.

SUMMARY OF THE INVENTION

Embodiments of the invention provide a method, device and system for controlling a User Equipment (UE) so as to control a UE capable of proximity awareness in a network to which a D2D communication mechanism for a mutual discovery and even direct communication between mobile devices is introduced.

Particular technical solutions according to the embodiments of the invention are as follows:

A method for controlling a User Equipment (UE) includes:

receiving, by a Mobility Management Entity (MME), a Device to Device (D2D) request message of a UE transmitted by an evolved Node B (eNB), determining requested D2D features according to the D2D request message, determining acceptable one of the requested D2D features and transmitting the accepted D2D feature to the eNB; and judging, by the eNB, whether to accept the D2D request of the UE upon reception of the accepted D2D feature returned by the MME, and if so, then configuring by the eNB, resource and instructing the UE to perform configuration of the accepted D2D feature; otherwise, rejecting, by the eNB, the D2D request of the UE.

A method for controlling a User Equipment (UE) includes:

receiving, by an evolved Node B (eNB), a Device to Device (D2D) request from a UE; and judging, by the eNB whether to accept the D2D request of the UE, and if so, then transmitting the D2D request message to a Mobility Management Entity (MME), and configuring resource and instructing the UE to perform configuration of an accepted D2D feature returned by the MME upon reception of the accepted D2D feature; otherwise, rejecting the D2D request of the UE, wherein the accepted D2D feature returned by the MME is acceptable one of the D2D features requested by the D2D request message, which is determined by the MME according to the D2D request message.

A network-side device includes:

a receiving component configured to receive a Device to Device (D2D) request message of a User Equipment (UE) transmitted by an evolved Node B (eNB);

a determining component configured to determine requested D2D features according to the D2D request message and to determine acceptable one of the requested D2D features; and a transmitting component configured to transmit the accepted D2D feature to the eNB.

A network-side device includes:

a communicating component configured to receive a Device to Device (D2D) request message of a User Equipment (UE), to transmit the D2D request message to a Mobility Management Entity (MME) and to receive an accepted D2D feature returned by the MME, wherein the accepted D2D feature is acceptable one of D2D features requested by the D2D request message, which is determined by the MME according to the D2D request message; and a processing component configured to judge whether to accept the D2D request of the UE after the communicating component receives the accepted D2D feature, and if so, to configure resource and instruct the UE to perform configuration of the accepted D2D feature; otherwise, to reject the D2D request of the UE.

A network-side device includes:

a receiving component configured to receive a Device to Device (D2D) request message of a User Equipment (UE); and a processing component configured to judge whether to accept the D2D request of the UE, and if so, to transmit the D2D request message to a Mobility Management Entity (MME), and to configure resource and instruct the UE to perform configuration of an accepted D2D feature returned by the MME upon reception of the accepted D2D feature; otherwise, to reject the D2D request of the UE, wherein the accepted D2D feature is acceptable one of D2D features requested by the D2D request message, which is determined by the MME according to the D2D request message.

A system for controlling a UE includes:

a UE is configured to transmit a Device to Device (D2D) request message to an evolved Node B (eNB);

the eNB configured to receive the D2D request message of the UE, to transmit the request message to an Mobility Management Entity (MME), to judge whether to accept the D2D request of the UE upon reception of an accepted D2D feature returned by the MME, and if so, to configure resource and instruct the UE to perform configuration of the accepted D2D feature; otherwise, to reject the D2D request of the UE, or the eNB configured to receive the D2D request message of the UE, to judge whether to accept the D2D request of the UE, and if so, to transmit the D2D request message to the MME, and to configure resource and instruct the UE to perform configuration of an accepted D2D feature returned by the MME upon reception of the accepted D2D feature; otherwise, to reject the D2D request of the UE; and the MME configured to determine requested D2D features according to the D2D request message of the UE transmitted by the eNB, to determine acceptable one of the D2D features requested by the UE, and to transmit the accepted D2D feature to the eNB.

With the technical solutions above, in the embodiments of the invention, the UE transmits a D2D request message to the network side, and the MME determines acceptable one of D2D features requested by the UE and transmits the accepted D2D feature to the eNB, so that the MME controls the UE capable of proximity awareness; and The eNB judges whether the D2D request of the UE is acceptable before or after receiving the D2D feature returned by the MME, and judges according to a result of the judgment whether to reject the D2D request of the UE, and when the D2D request of the UE is acceptable, the eNB configures resource according to the accepted D2D feature returned by the MME and instructs the UE to perform configuration of the accepted D2D feature, so that the eNB controls the UE capable of proximity awareness.

In summary a UE capable of proximity awareness can be controlled in a network to which a D2D communication mechanism for a mutual discovery and even direct communication between mobile devices is introduced.

DETAILED DESCRIPTION OF THE EMBODIMENTS

Embodiments of the invention provide a method, device and system for controlling a User Equipment (UE) so as to control a UE capable of proximity awareness in a network to which a D2D communication mechanism for a mutual discovery and even direct communication between mobile devices is introduced.

Preferred embodiments of the invention will be described below in details with reference to the drawings.

In the following embodiments, a D2D feature might be any one of being capable of discovering another UE but incapable of being discovered by another UE; being capable of being discovered by another UE but incapable of discovering another UE; and being capable of discovering another UE and capable of being discovered by another UE. These are listed here only as examples, but there may also exist other D2D features in a real application, and they can be equally applicable, if any, to the following embodiments of the invention for controlling a UE without departing from the scope of the invention.

Figure 1:
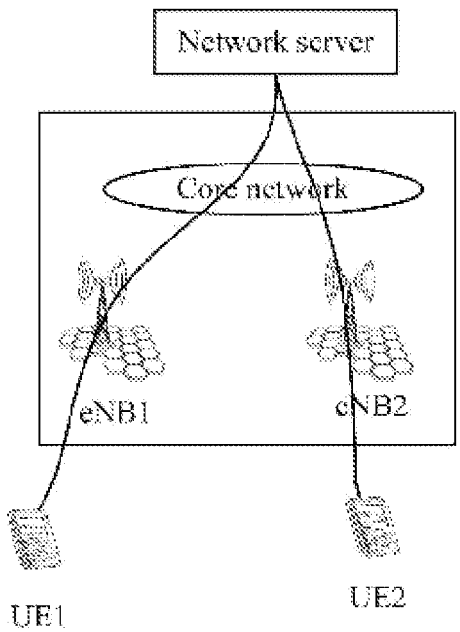
FIG. 1 illustrates a schematic diagram of communication between UEs in the prior art.
Figure 2:
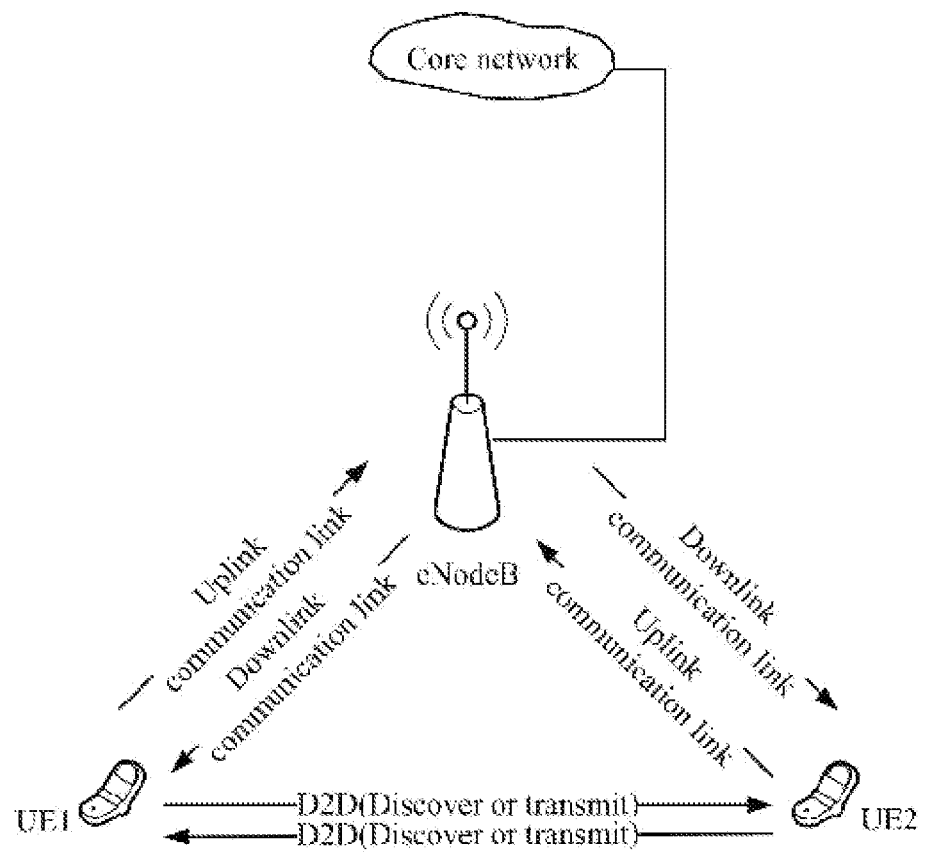
FIG. 2 illustrates a schematic structural diagram of the network to which the D2D technology is introduced in the prior art.
Figure 3:
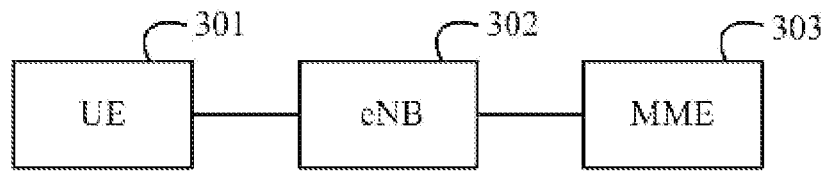
FIG. 3 illustrates an architectural diagram of a system for controlling a UE according to an embodiment of the invention.

As illustrated in FIG. 3, there is a system for controlling a UE according to a first embodiment, and the system generally includes a UE 301, an eNB 302 and an MME 303, where:

The UE 301 is configured to transmit a D2D request message to the eNB 302;

The eNB 302 is configured to receive the D2D request message of the UE 301, to transmit the request message to the MME 303, to judge whether to accept the D2D request of the UE 301 upon reception of an accepted D2D feature returned by the MME 303, and if so, to configure resource and instruct the UE 301 to perform configuration of the accepted D2D feature; otherwise, to reject the D2D request of the UE, or The eNB 302 is configured to receive the D2D request message of the UE 301, to judge whether to accept the D2D request of the UE 301, and if so, to transmit the D2D request message to the MME 303, and to configure resource and instruct the UE 301 to perform configuration of an accepted D2D feature returned by the MME 303 upon reception of the accepted D2D feature; otherwise, to reject the D2D request of the UE; and The MME 303 is configured to determine requested D2D features according to the D2D request message of the UE 301 transmitted by the eNB 302, to determine acceptable one of the D2D features requested by the UE, and to transmit the accepted D2D feature to the eNB 302.

Particularly the D2D request message carries information about the requested D2D features and activation/deactivation indication information of the requested D2D features.

Preferably the UE carries the D2D feature-related information and the activation/deactivation indication information of the D2D features in a Radio Resource Control (RRC) message or a Non-Access Stratum (NAS) message, that is, the RRC message or the NAS message is used as the D2D request message.

Particularly the MME determines the D2D features requested by the UE according to the D2D feature-related information carried in the D2D request message.

Particularly the eNB instructs the UE to activate/deactivate the D2D feature accepted by the MME according to the activation/deactivation indication information carried in the D2D request message.

Preferably the D2D feature-related information includes any one of indication information for indicating the D2D features; the types of services for determining the D2D features; and the D2D features. These are listed here as examples but not intended to limit the scope of the invention, and, other types of D2D feature-related information may also be applicable, if any, in a real application without departing from the scope of the invention.

Particularly when the D2D feature-related information is the indication information or the types of services, the network side needs to determine the corresponding D2D features according to either the particular indication information or types of services, and when the D2D feature-related information is the D2D features, the network side can retrieve the D2D features directly.

Particularly when the D2D feature-related information is the types of services for determining the D2D features, the MME determines, according to a preset mapping relationship between the types of services and the D2D features, that the D2D features corresponding to the types of services carried in the D2D request message are the D2D features requested by the UE.

Particularly when the D2D feature-related information is the indication information for indicating the D2D features, the MME determines, according to a preset mapping relationship between the indication information and the D2D features, the D2D features corresponding to the indication information carried in the D2D request message are the D2D features requested by the UE.

In this embodiment, the MME determines the acceptable D2D feature particularly as follows: the MME determines a set of D2D features capable of serving the UE according to subscription data of the UE and a network policy; and the MME determines one of the D2D features requested by the UE, which belongs to the set is the acceptable D2D feature.

Particularly the network policy is typically configured so that in the event that the UE of a subscriber is roaming, the MME serving the current network judges whether to provide the UE with a D2D feature service according to subscription data of the UE stored at a home network and a real condition of the local network, that is, the D2D feature acceptable to the MME satisfies two conditions of being a D2D feature subscribed by the UE and a D2D feature supported by the current network.

Particularly the MME transmits the accepted D2D feature to the eNB after determining the acceptable D2D feature, and particularly the MME can transmit the accepted D2D feature to the eNB by carrying it in an Initial Context Create message; or the MME can transmit the accepted D2D feature to the eNB by carrying it in an S1 interface application protocol layer (S1-AP) message.

In a particular implementation, the eNB judges according to a current use condition of radio resources, interference strength, etc., whether the D2D request of the UE is acceptable upon reception of the D2D request message of the UE; and if so, then the eNB further forwards the D2D request message of the UE to the MME, the MME transmits the accepted D2D feature to the eNB after determining according to the D2D request message the D2D features requested by the UE and determining the acceptable D2D feature, and the eNB further configures the resource according to the D2D feature accepted by the MME and then instructs the UE to perform configuration of the D2D feature accepted by the ME; otherwise, the eNB rejects directly the D2D request of the UE and notifies the MME that the D2D request of the UE is unacceptable.

In another particular embodiment, the eNB forwards the D2D request message of the UE directly to the MME upon reception thereof, and the MME transmits the accepted D2D feature to the eNB after determining according to the D2D request message the D2D features requested by the UE and determining the acceptable D2D feature; and the eNB judges according to a current use condition of radio resources, interference strength, etc., whether the D2D request of the UE is acceptable, and if so, then the eNB configures the resource according to the D2D feature accepted by the MME and then instructs the UE to perform configuration of the D2D feature accepted by the ME; otherwise, the eNB rejects the D2D request of the UE and notifies the UE and the MME that the D2D request of the UE is rejected.

In this embodiment, the eNB configures the resource particularly as follows: the eNB allocates resource to be occupied for performing the D2D feature accepted by the MME or releases resource occupied by the D2D feature accepted by the MME.

Particularly the resource includes a common resource and/or a dedicated resource.

Particularly if the resource configured by the eNB for the D2D feature accepted by the MME is dedicated resource, then another UE, capable of proximity awareness, proximate to the UE needs to be notified of the configured dedicated resource, particularly in an RRC message or a broadcast message.

Particularly the UE transmits and/or receives a D2D service (with the D2D feature) over the configured resource.

Figure 4:
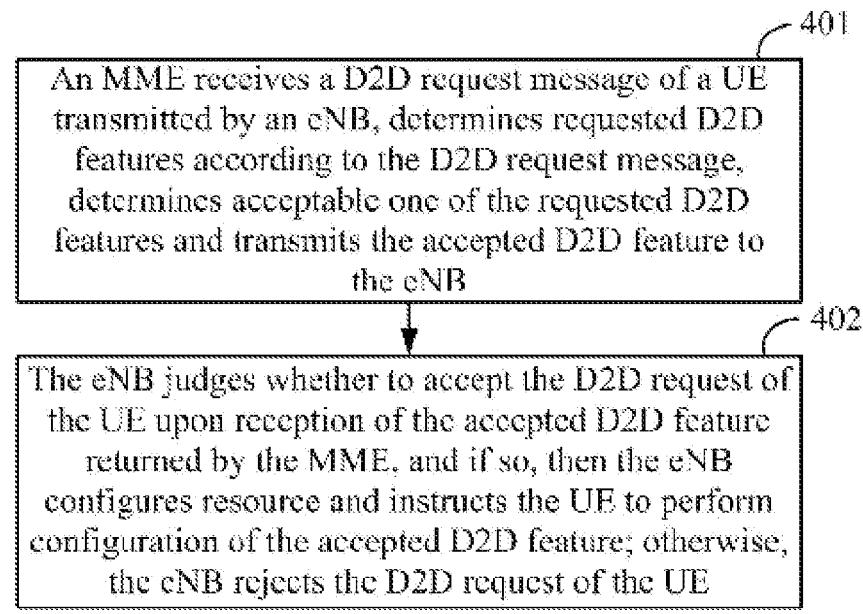
FIG. 4 illustrates a flow chart of a method for controlling a UE according to an embodiment of the invention.
Figure 5:
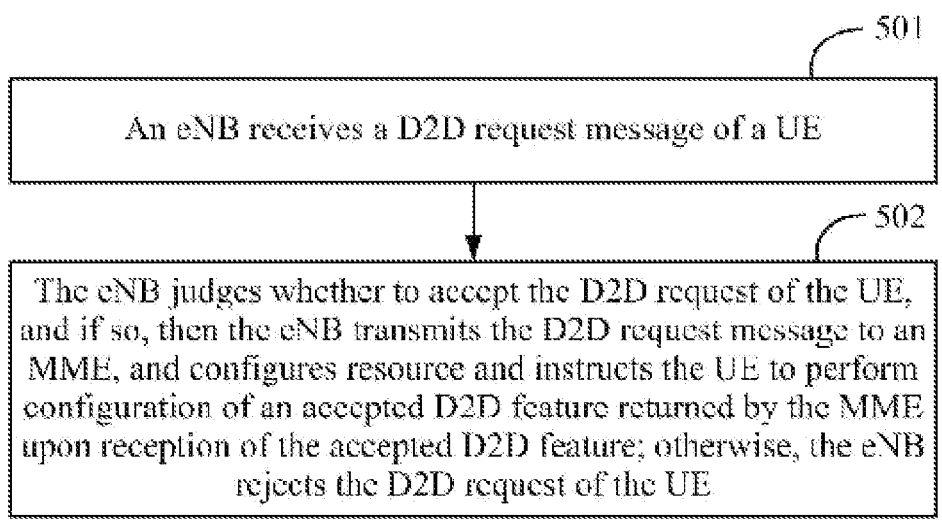
FIG. 5 illustrates a flow chart of another method for controlling a UE according to an embodiment of the invention.

Based upon the same inventive idea, a second embodiment of the invention provides a method for controlling a UE as illustrated in FIG. 4, which is a method in which firstly an MME and then an eNB performs admission control in the following detailed flow:

In the step 401, an MME receives a D2D request message of a UE transmitted by an eNB, determines requested D2D features according to the D2D request message, determines acceptable one of the requested D2D features and transmits the accepted D2D feature to the eNB.

Particularly the D2D request message carries information about the requested D2D features and activation/deactivation indication information of the requested D2D features.

Particularly the MME determines the D2D features requested by the UE according to the D2D feature-related information carried in the D2D request message.

In this embodiment, the D2D feature-related information includes any one of indication information for indicating the D2D features; the types of services for determining the D2D features; and the D2D features.

Particularly when the D2D feature-related information is the types of services for determining the D2D features, the MME determines, according to a preset mapping relationship between the types of services and the D2D features, that the D2D features corresponding to the types of services carried in the D2D request message are the D2D features requested by the UE.

Particularly when the D2D feature-related information is the indication information for indicating the D2D features, the MME determines, according to a preset mapping relationship between the indication information and the D2D features, the D2D features corresponding to the indication information carried in the D2D request message are the D2D features requested by the UE.

Particularly the MME determines the acceptable one of the requested D2D features particularly as follows: the MME determines a set of D2D features capable of serving the UE according to subscription data of the UE and a network policy; and the MME determines one of the D2D features requested by the UE, which belongs to the set is the acceptable D2D feature.

In this embodiment, the MME can transmit the accepted D2D feature to the eNB particularly as follows: the MME transmits the accepted D2D feature to the eNB by carrying it in an Initial Context Create message; or the MME transmits the accepted D2D feature to the eNB by carrying it in an S1-AP message.

In the step 402, the eNB judges whether to accept the D2D request of the UE upon reception of the accepted D2D feature returned by the MME, and if so, then the eNB configures resource and instructs the UE to perform configuration of the accepted D2D feature; otherwise, the eNB rejects the D2D request of the UE.

In a particular implementation, the eNB forwards the D2D request message of the UE directly to the MME; the MME determines the acceptable D2D feature according to the D2D request message of the UE and transmits the accepted D2D feature to the eNB; and the eNB judges according to a current use condition of radio resources, interference strength, etc., whether to accept the D2D request of the UE, and if so, then the eNB allocates resource to be occupied for performing the D2D feature accepted by the MME or releases resource occupied by the D2D feature accepted by the MME, and instructs the UE to perform configuration of the accepted D2D feature; otherwise, the eNB prohibits the UE from performing configuration of the accepted D2D feature, that is, the eNB rejects the D2D request of the UE.

In this embodiment, the eNB configures the resource and then instructs the UE to perform configuration of the accepted D2D feature accepted by the MME particularly as follows: the eNB instructs the UE to activate the accepted D2D feature accepted by the MME according to the activation indication information carried in the D2D request message; or The eNB configures the resource and then instructs the UE to perform configuration of the accepted D2D feature accepted by the MME particularly as follows: the eNB instructs the UE to deactivate the accepted D2D feature accepted by the MME according to the deactivation indication information carried in the D2D request message Based upon the same inventive idea, a third embodiment of the invention provides a method for controlling a UE as illustrated in FIG. 4, which is a method in which firstly an eNB and then an MME performs admission control in the following detailed flow:

In the step 501, an eNB receives a D2D request message of a UE;

Particularly the D2D request message carries information about requested D2D features and activation/deactivation indication information of the D2D features.

Particularly the D2D feature-related information includes any one of indication information for indicating the D2D features; the types of services for determining the D2D features; and the D2D features.

In the step 502, the eNB judges whether to accept the D2D request of the UE, and if so, then the eNB transmits the D2D request message to an MME, and configures resource and instructs the UE to perform configuration of an accepted D2D feature returned by the MME upon reception of the accepted D2D feature; otherwise, the eNB rejects the D2D request of the UE.

Particularly the accepted D2D feature returned by the MME is acceptable one of the D2D features requested by the D2D request message, which is determined by the MME according to the D2D request message.

Particularly the eNB transmits the D2D request message to the MME, and then the MME determines the D2D features requested by the UE according to the D2D feature-related information carried in the D2D request message; the MME determines a set of D2D features capable of serving the UE according to subscription data of the UE and a network policy; and the MME determines one of the D2D features requested by the UE, which belongs to the set is the acceptable D2D feature.

Particularly when the D2D feature-related information is the types of services for determining the D2D features, the MME determines, according to a preset mapping relationship between the types of services and the D2D features, that the D2D features corresponding to the types of services carried in the D2D request message are the D2D features requested by the UE.

Particularly when the D2D feature-related information is the indication information for indicating the D2D features, the MME determines, according to a preset mapping relationship between the indication information and the D2D features, the D2D features corresponding to the indication information carried in the D2D request message are the D2D features requested by the UE.

In this embodiment, the UE can receive the accepted D2D feature returned by the MME in either of the following implementations: the eNB receives an Initial Context Create Request message, transmitted by the MME, carrying the accepted D2D feature and retrieves the accepted D2D feature; or the eNB receives an S1-AP message, transmitted by the MME, carrying the accepted D2D feature and retrieves the accepted D2D feature.

Particularly the eNB judges according to a current use condition of radio resources, interference strength, etc., whether to accept the D2D request of the UE upon reception of the D2D request message of the UE; and if so, then the eNB transmits the D2D request message of the UE to the MME, the MME determines the acceptable D2D feature according to the D2D request message of the UE and transmits the accepted D2D feature to the eNB, and the NB allocates resource to be occupied for performing the D2D feature accepted by the MME or releases resource occupied by the D2D feature accepted by the MME, and instructs the UE to perform configuration of the accepted D2D feature; otherwise, the eNB rejects directly the D2D request of the UE.

In the particular implementation, the eNB rejects the D2D request of the UE and notifies the UE and the MME that the D2D request of the UE is rejected.

In this embodiment, the eNB instructs the UE to activate/deactivate the D2D feature accepted by the ME according to the activation/deactivation indication information carried in the D2D request message.

A process of controlling a UE according to the embodiments of the invention will be described below in details with reference to a first particular embodiment to a sixth particular embodiment.

The following particular embodiments will be described below taking an eNB as an example, but a real application thereof will not be limited to an eNB.

Figure 6:
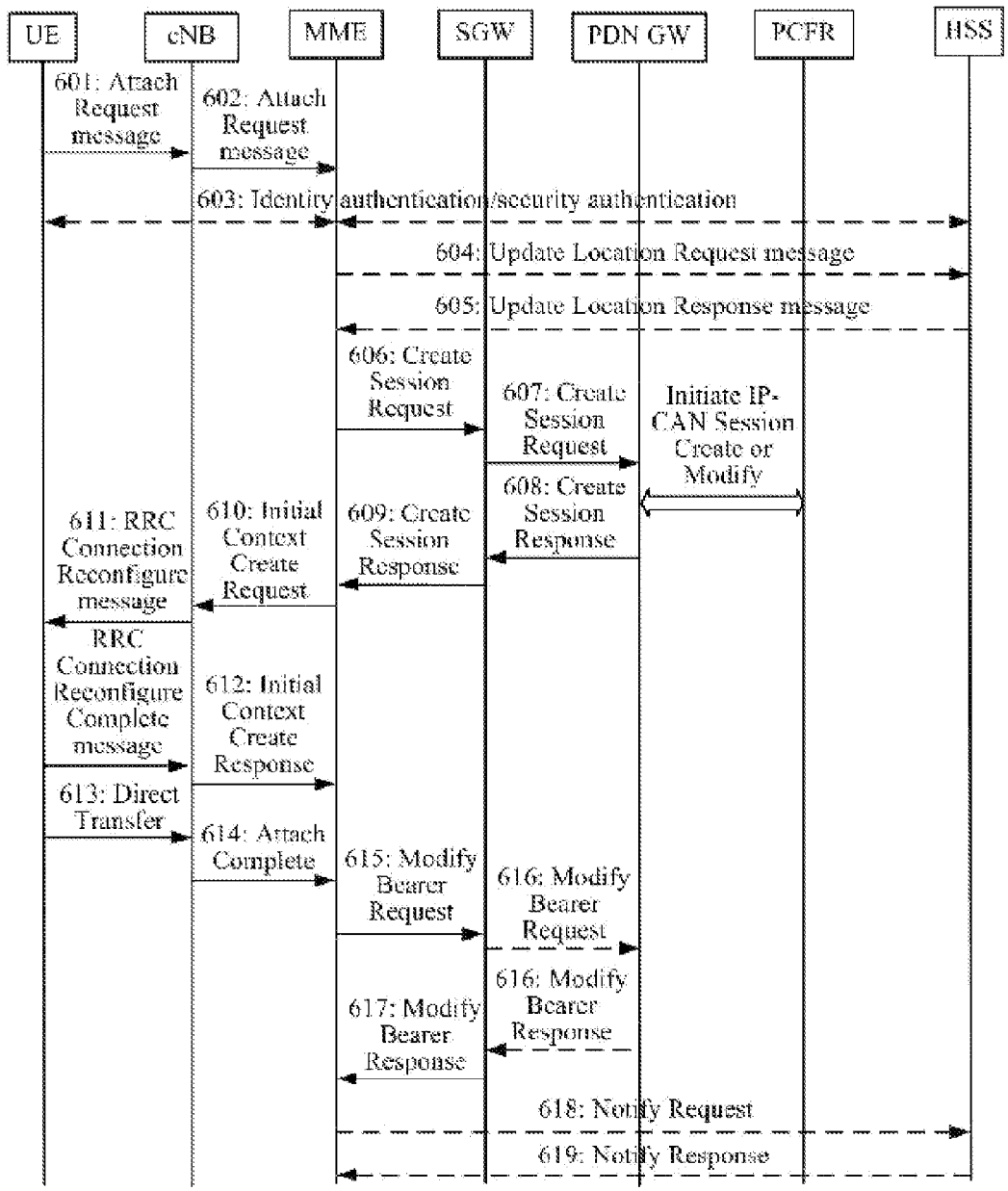
FIG. 6 illustrates a particular schematic flow chart of a first embodiment of the invention.

In a first particular embodiment, as illustrated in FIG. 6, a UE being initially powered up activates/deactivates a D2D feature in this particular embodiment particularly as follow:

In the step 601, a UE reports a D2D request, which can be carried in an NAS or RRC message, to an eNB to activate/deactivate a D2D feature in an Attach Request message, and the eNB handles the D2D request of the UE in the following two implementations upon reception thereof:

In a first implementation, the eNB forwards the D2D request directly, that is, the eNB proceeds directly to the step 602; and In a second implementation, the eNB transmits the D2D request of the UE to an MME in the step 602 after determining according to a current use condition of radio resources and interference strength the D2D request to be accepted; and notifies the MME that the D2D request of the UE is unacceptable after determining the D2D request of the UE to be unacceptable.

In the step 602, the eNB transmits to the MME an Attach Request message which can particularly be an NAS message or an S1-AP message carrying the D2D request of the UE.

In the step 603, the MME performs identity authentication and security authentication on the UE.

In the steps 604 to 605, the MME retrieves subscription data of the UE, including D2D features subscribed by the UE, from an HSS using an Update Location Request message and an Update Location ACK message.

In the steps 606 to 609, a core network sets up a user plane bearer for the UE, and particularly the MME transmits a Create Session Request to a Serving Gateway (SGW), the SGW transmits the Create Session Request to a Packet Data Network Gateway (PDN GW), the PDN GW interacts with a Policy Control and Charging Rule (PCRF) function, the PCRF initiates an IP-Connectivity Access Network (IP-CAN) session creation or modification procedure, and then the PDG GW returns a Create Session Response to the SGW, thus completing the downlink setup, and if there is no link to be switched, then the PDN GW transmits first downlink data to the SGW, and the MME receives the Create Session Response returned by the PDN GW.

In the step 610, the MME determines D2D features requested by the UE according to the D2D request of the UE and determines acceptable one of the D2D features requested by the UE according to the retrieved subscription data of the UE and a network policy, and the MME returns the D2D feature accepted by the MME to the eNB in an initial UE context creation procedure.

In the step 611, the eNB handles an Initial UE Context Create Request message of the MME in the following two implementations upon reception thereof:

In correspondence to the first implementation of the step 601, the eNB allocates or releases for the UE resource occupied for the D2D feature accepted by the MME after determining according to the current use condition of radio resources and interference strength the D2D request of the UE to be accepted; and notifies the MME and the UE that the D2D request of the UE is unacceptable after determining the D2D request of the UE to be unacceptable; and In correspondence to the second implementation of the step 601, the eNB transmits an RRC Connection Reconfigure message carrying the D2D feature accepted by the MME to the UE after allocating or releasing for the UE resource occupied for the D2D feature accepted by the MME.

The eNB transmits the information about the allocated or released resource and the D2D feature accepted by the MME to the UE, and the UE activates/deactivates the D2D feature, accepted by the MME, returned by the eNB.

In the step 612, the UE returns an RRC Connection Reconfigure Complete message to the eNB, and then the eNB returns an Initial UE Context Create Response message to the MME.

In correspondence to the first implementation of the step 601, the eNB carries in the message a result of whether the eNB accepts the D2D request of the UE.

In the steps 613 to 619, the UE accesses the network and performs a bearer establishment procedure particularly as follows: the UE transmits a Direct Transfer message to the eNB, and the eNB transmits an Attach Complete message to the MME, thus completing the uplink setup, and the UE can transmit first uplink data to the PDN GW, the MME transmits a Modify Bearer Request to the SGW, and the SGW requests the PDN GW for modifying the bearer and forwards a Modify Bearer Response returned by the PDN GW to the MME upon reception thereof, thus completing the bearer modification procedure, and the PDN GW can transmit first downlink data to the UE.

The MME initiates a Notify Request to the HSS and receives a Notify Response returned by the HSS.

Figure 7:
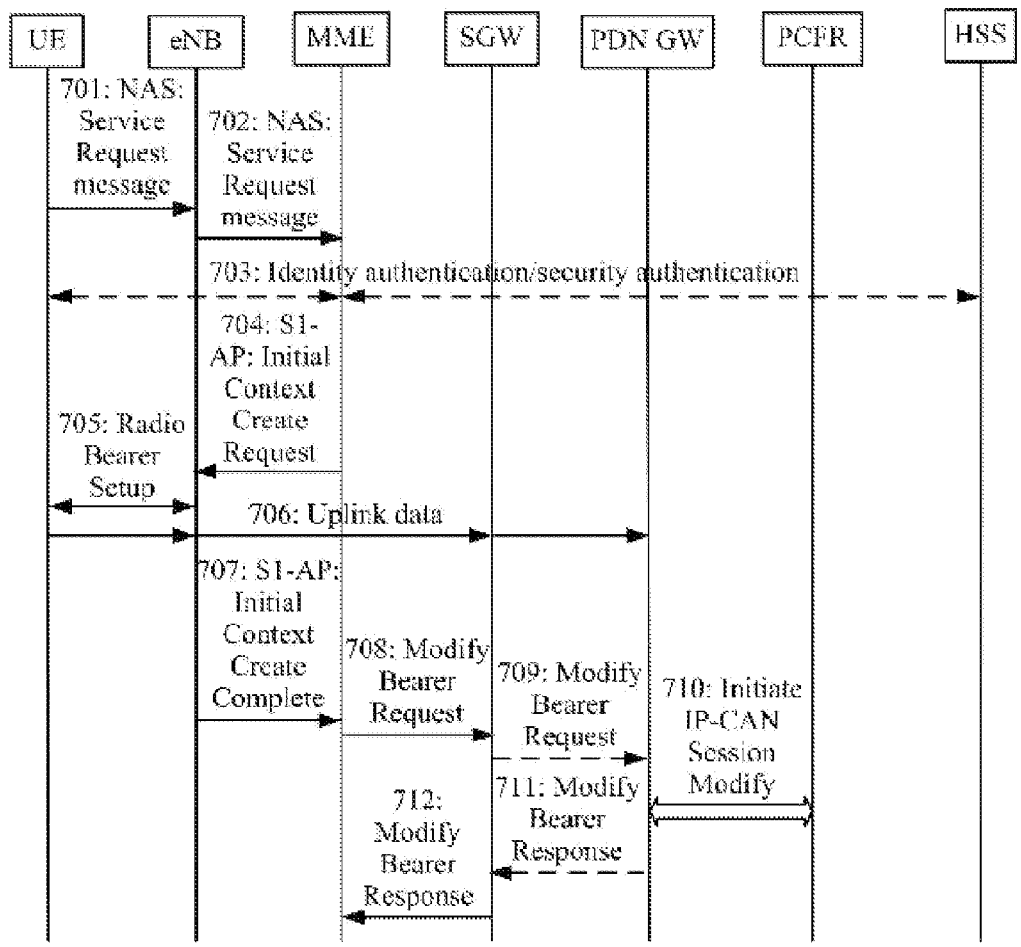
FIG. 7 illustrates a particular schematic flow chart of a second embodiment of the invention.

In a second particular embodiment, as illustrated in FIG. 7, an idle UE activates/deactivates a D2D feature in a service request procedure in this particular embodiment particularly as follow:

In the step 701, a UE reports a D2D request, which can be carried in an NAS or RRC message, to an eNB to activate/deactivate a D2D feature in a Service Request message. The eNB handles the D2D request of the UE in the following two implementations upon reception thereof:

In a first implementation, the eNB forwards the D2D request directly to an MME; and In a second implementation, the eNB transmits the D2D request of the UE to the MME after determining according to a current use condition of radio resources and interference strength the D2D request to be accepted; and notifies the MME that the D2D request of the UE is unacceptable after determining the D2D request of the UE to be unacceptable.

In the step 702, the eNB transmits to the MME a Service Request message which can be an NAS or S1-AP message.

In the step 703, the MME performs identity authentication and security authentication on the UE.

In the step 704, the MME determines D2D features requested by the UE according to the D2D request of the UE and determines acceptable one of the D2D features requested by the UE according to retrieved subscription data of the UE and a network policy, and the MME returns the D2D feature accepted by the MME to the eNB in an initial UE context creation procedure.

In the step 705, the eNB handles an Initial UE Context Create Request message of the MME in the following two implementations upon reception thereof:

In correspondence to the first implementation of the step 701, the eNB allocates or releases for the UE resource occupied for the D2D feature accepted by the MME after determining according to the current use condition of radio resources and interference strength the D2D request of the UE to be accepted; and notifies the MME and the UE that the D2D request of the UE is unacceptable after determining the D2D request of the UE to be unacceptable; and In correspondence to the second implementation of the step 701, the eNB transmits an RRC Connection Reconfigure message carrying the D2D feature accepted by the MME to the UE after allocating or releasing for the UE resource occupied for the D2D feature accepted by the MME.

The eNB transmits the information about the allocated or released resource and the D2D feature accepted by the MME to the UE, and the UE activates/deactivates the D2D feature, accepted by the MME, returned by the eNB.

In the step 706, the UE transmits uplink data to the network side.

In the step 707, the eNB returns an Initial UE Context Create Complete response message to the MME.

In correspondence to the first implementation of the step 701, the eNB carries in the response message a result of whether the eNB accepts the D2D request of the UE.

In the steps 708 to 712, the MME transmits a Modify Bearer Request to the SGW, the SGW forwards it to the PDN GW, then the PDN GW initiates an IP-CAN session modification procedure to the PCRF and then returns a Modify Bearer Response to the SGW, and the SGW transmits the response to the MME.

Figure 8:
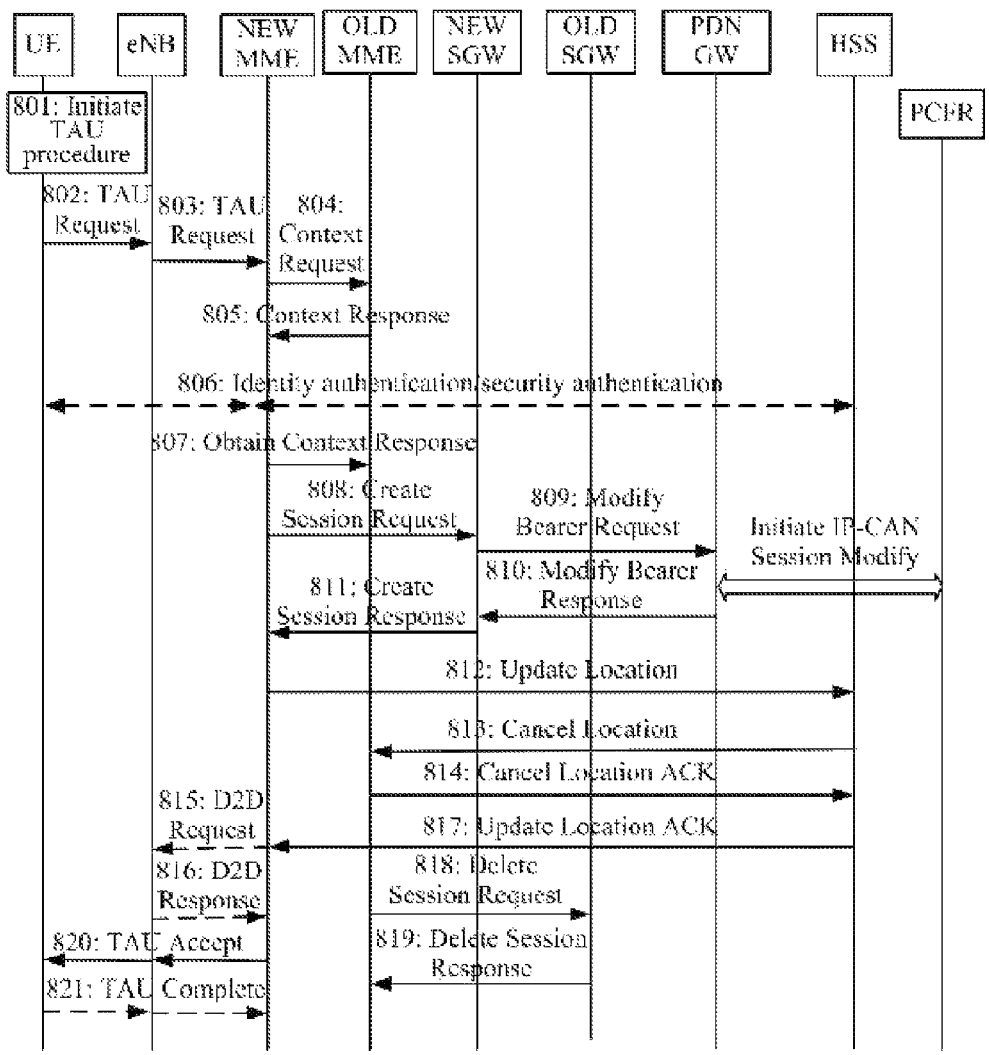
FIG. 8 illustrates a particular schematic flow chart of a third embodiment of the invention.

In a third particular embodiment, as illustrated in FIG. 8, an idle UE activates/deactivates a D2D feature in a Tracking Area Update (TAU) procedure in this particular embodiment particularly as follow:

In the step 801, a UE triggers a TAU procedure to be started.

In the step 802, the UE reports a D2D request, which can be carried in an NAS or RRC message, to an eNB to activate/deactivate a D2D feature in a TAU Request message. The eNB handles the D2D request of the UE in the following two implementations upon reception thereof:

In a first implementation, the eNB forwards the D2D request directly to an MME; and In a second implementation, the eNB transmits the D2D request of the UE to the MME after determining according to a current use condition of radio resources and interference strength the D2D request to be accepted; and notifies the MME that the D2D request of the UE is unacceptable after determining the D2D request of the UE to be unacceptable.

In the step 803, the eNB transmits a TAU Request message, which can be an NAS or S1-AP message, to a new MME (i.e., an MME to which the UE is roaming)

In the steps 804 to 807, the new MME retrieves subscription data of the UE, including D2D features subscribed by the UE, from the old MME (i.e., an MME to which the UE subscribes). Particularly the new MME transmits a Context Request to the old MME, and the old MME carries the subscription data of the UE in a returned Context Response. The new MME returns an acknowledgement message (Context Acknowledge) to the old MME to retrieve the context after performing identity authentication and security authentication on the UE.

The new MME determines D2D features requested by the UE according to the D2D request of the UE, and determines acceptable one of the D2D features requested by the UE according to the retrieved subscription data of the UE and a network policy.

In the steps 808 to 819, a core network establishes a user plane bearer for the UE.

Particularly the new MME initiates a Create Session Request to the corresponding new SGW, the new SGW initiates a Modify Bearer Request to the PDN GW upon reception of the Create Session Request, the PCRF initiates an IP-CAN session modification procedure, and then the PDN GW returns a Modify Bearer Response to the new SGW, and the new SGW returns a Create Session Response to the new MME. The new MME transmits an Update Location message to the HSS, the HSS transmits a Cancel Location message to the old MME, the old MME returns a Cancel Location ACK to the HSS, and then the HSS returns an Update Location ACK to the new MME.

Particularly in the steps 815 and 816, the new MME transmits the D2D request to the eNB to transmit a D2D feature accepted by the new MME to the eNB, and the eNB determines according to a current use condition of radio resources, interference strength, etc., whether the D2D request of the UE is acceptable, and returns to the new MME a D2D response carrying a result of whether to accept the D2D request of the UE. This will be applicable only to the first implementation of the step 802 but not to the second implementation of the step 802.

In the meanwhile, the old MME transmits a Delete Session Request to the corresponding old SGW and returns a Delete Session Response returned by the old SGW.

In the stem 820, the new MME returns the D2D feature accepted by the new MME to the eNB in an initial UE context creation procedure or in an NAS downlink Direct Transfer message, the eNB allocates or releases resource according to the D2D feature accepted by the new MME and then transmits to the UE a result of admission by the network side, including the D2D feature accepted by the new MME and information about the resource configured or released by the eNB, and the UE activates/deactivates the corresponding D2D feature according to the result of admission by the network side and performs subsequent D2D operations. In this step, the new MME transmits a TAU Accept message to the eNB, and the eNB further forwards it to the UE.

In the step 821, the UE returns an NAS TAU Complete message to the new MME through the eNB.

Figure 9:
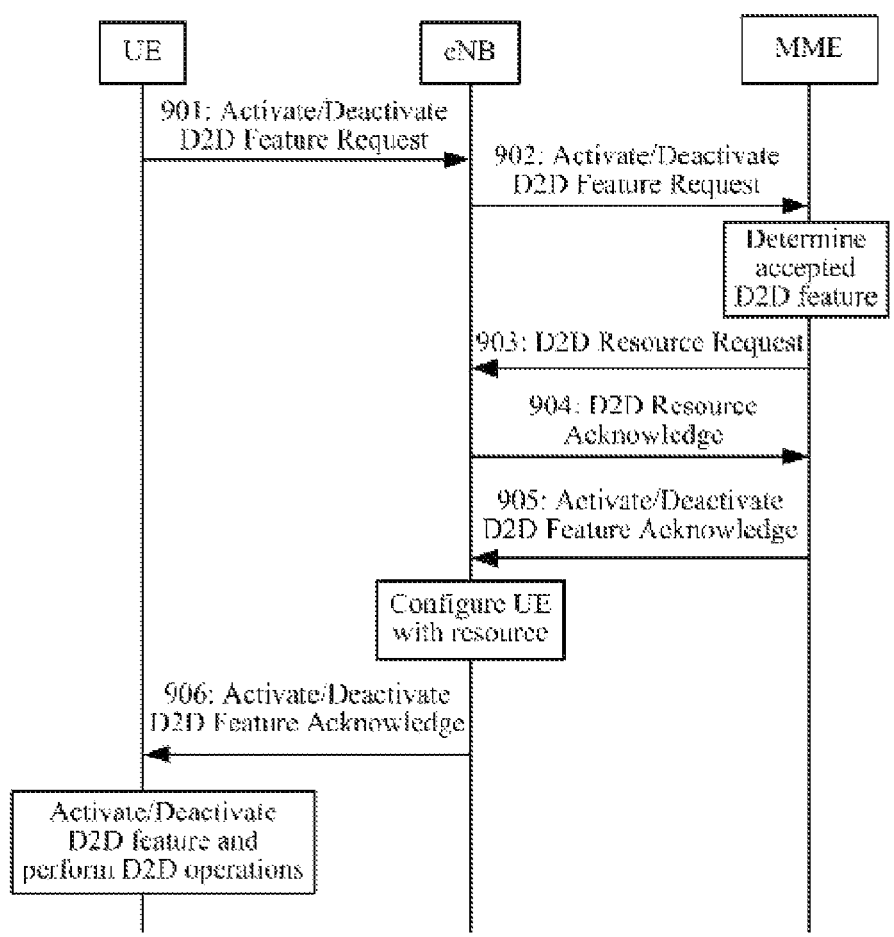
FIG. 9 illustrates a particular schematic flow chart of a fourth embodiment of the invention.

In a fourth particular embodiment, as illustrated in FIG. 9, if a connected UE needs to activate/deactivate a D2D feature, then an MME and then an eNB can perform an admission decision in a new NAS procedure or RRC procedure or S1-AP procedure in this particular embodiment particularly as follows:

In the step 901, a UE transmits a request message, which can be an NAS or RRC layer message, to an eNB to activate/deactivate a D2D feature.

In the step 902, the eNB transmits to an MME a request message, which can be an NAS or S1-AP message, to activate/deactivate a D2D feature.

In the step 903, the MME determines D2D features requested by the UE and determines acceptable one of the D2D features requested by the UE according to retrieved subscription data of the UE and a network policy, and if the MME prohibits the D2D request of the UE from an access, then the MME returns a Reject message; otherwise, the MME transmits a D2D Resource Request message to the eNB.

In the step 904, the eNB acknowledges a D2D resource upon reception of the D2D Resource Request message of the MME, judges according to a current use condition of radio resources, interference strength, etc., whether to accept the D2D request of the UE, and returns a result to the MME.

In the step 905, the MME returns to the eNB an ACK message, to activate/deactivate a D2D feature, carrying the D2D feature accepted by the MME.

In the step 906, the eNB returns to the UE an ACK message, to activate/deactivate a D2D feature, carrying the D2D feature accepted by the MME after allocating the resource for the D2D feature accepted by the MME.

Figure 10:
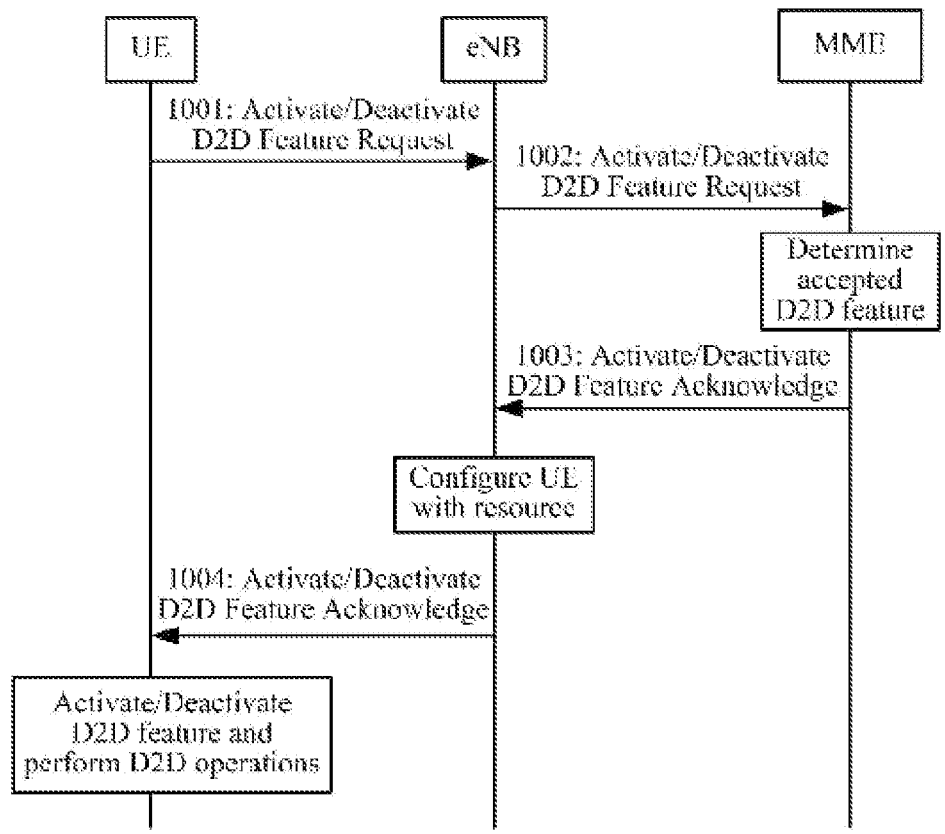
FIG. 10 illustrates a particular schematic flow chart of a fifth embodiment of the invention.

In a fifth particular embodiment, as illustrated in FIG. 10, if a connected UE needs to activate/deactivate a D2D feature, then an eNB and then an MME can perform an admission decision in a new NAS procedure or RRC procedure or S1-AP procedure in this particular embodiment particularly as follows:

In the step 1001, a UE transmits a request message, which can be an NAS or RRC layer message, to an eNB to activate/deactivate a D2D feature. The eNB judges according to a current use condition of radio resources, interference strength, etc., whether to accept the D2D request of the UE, and if it is unacceptable, then the eNB rejects the request of the UE directly.

In the step 1002, the eNB transmits to an MME a request message, which can be an NAS or S1-AP message, to activate/deactivate a D2D feature.

In the step 1003, the MME determines D2D features requested by the UE and determines acceptable one of the D2D features requested by the UE according to retrieved subscription data of the UE and a network policy, and if the MME prohibits the D2D request of the UE from an access, then the MME returns a Reject message; otherwise, the MME returns the D2D feature accepted by the MME to the eNB in an ACK message to activate/deactivate a D2D feature and requests the eNB for a D2D resource.

In the step 1004, the eNB configures (allocates or releases) the corresponding resource upon reception of the ACK message of the MME to activate/deactivate a D2D feature and then transmits to the UE an ACK message, to activate/deactivate a D2D feature, carrying the D2D feature accepted by the MME.

In a sixth particular embodiment, if an idle UE needs to activate/deactivate a D2D feature, then the UE can firstly be connected in an existing service request/TAU procedure and then be operatively controlled to activate/deactivate a D2D feature in the new NAS procedure or RRC procedure or S1-AP procedure, described in the fourth particular embodiment or the fifth particular embodiment, in this particular embodiment.

Figure 11:
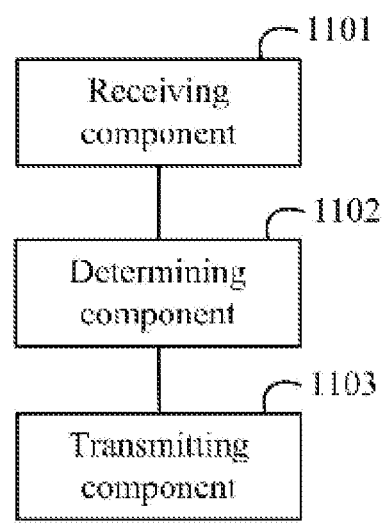
FIG. 11 illustrates a schematic structural diagram of a network-side device according to an embodiment of the invention.

Based upon the same inventive idea, an embodiment of the invention further provides a network-side device according to a fourth embodiment as illustrated in FIG. 11, and reference can be made to the particular implementation of the MME in the embodiments above for a particular implementation of the network-side device, so a repeated description thereof will be omitted here, and the network-side device generally includes:

A receiving component 1101 is configured to receive a D2D request message of a UE transmitted by an eNB;

A determining component 1102 is configured to determine requested D2D features according to the D2D request message and to determine acceptable one of the requested D2D features; and A transmitting component 1103 is configured to transmit the accepted D2D feature to the eNB.

Particularly the receiving component 1101 and the transmitting component 1103 can be transceiver capable of transmitting and receiving, and the determining component 1102 can be a processor, etc.

Particularly the determining component is configured to determine the D2D features requested by the UE according to D2D feature-related information carried in the D2D request message.

Particularly the D2D feature-related information includes indication information for indicating the D2D features, the types of services for determining the D2D features, or the D2D features.

Particularly the determining component is configured, when the D2D feature-related information is the types of services for determining the D2D features, to determine, according to a preset mapping relationship between the types of services and the D2D features, that the D2D features corresponding to the types of services carried in the D2D request message are the D2D features requested by the UE.

Particularly the determining component is configured, when the D2D feature-related information is the indication information for indicating the D2D features, to determine, according to a preset mapping relationship between the indication information and the D2D features, the D2D features corresponding to the indication information carried in the D2D request message are the D2D features requested by the UE.

Particularly the determining component is configured to determine a set of D2D features capable of serving the UE according to subscription data of the UE and a network policy; and to determine one of the D2D features requested by the UE, which belongs to the set is the acceptable D2D feature.

Particularly the transmitting component is configured to transmit the accepted D2D feature to the eNB by carrying it in an Initial Context Create message; or to transmit the accepted D2D feature to the eNB by carrying it in an S1-AP message.

Figure 12:
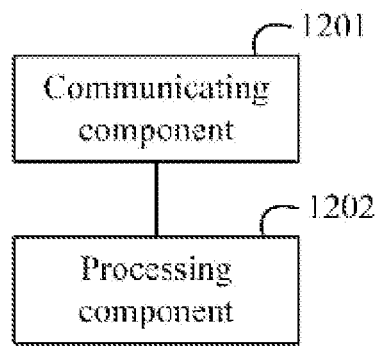
FIG. 12 illustrates a schematic structural diagram of another network-side device according to an embodiment of the invention.

Based upon the same inventive idea, an embodiment of the invention further provides a network-side device according to a fifth embodiment as illustrated in FIG. 12, and reference can be made to the particular implementation of the eNB in the second embodiment above for a particular implementation of the network-side device, so a repeated description thereof will be omitted here, and the network-side device generally includes:

A communicating component 1201 is configured to receive a D2D request message of a UE, to transmit the D2D request message to an MME and to receive an accepted D2D feature returned by the MME, where the accepted D2D feature is acceptable one of D2D features requested by the D2D request message, which is determined by the MME according to the D2D request message; and A processing component 1202 is configured to judge whether to accept the D2D request of the UE after the communicating component 1201 receives the accepted D2D feature, and if so, to configure resource and instruct the UE to perform configuration of the accepted D2D feature; otherwise, to reject the D2D request of the UE.

Particularly the communicating component 1201 can be a transceiver capable of transmitting and receiving, and the processing component 1202 can be a processor, etc.

Particularly the processing component is configured to judge according to a current use condition of radio resources and interference strength whether to accept the request of the UE.

Particularly the processing component is configured, if the D2D request of the UE is accepted, to allocate resource to be occupied for performing the D2D feature accepted by the MME or to release resource occupied by the accepted D2D feature.

Particularly the processing component is configured, if the D2D request of the UE is accepted and after the resource is configured, to instruct the UE to activate/deactivate the accepted D2D feature according to activation/deactivation indication information carried in the D2D request message.

Figure 13:
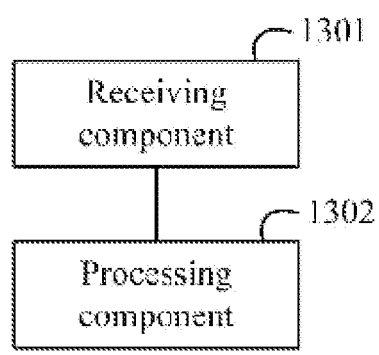
FIG. 13 illustrates a schematic structural diagram of still another network-side device according to an embodiment of the invention.

Based upon the same inventive idea, an embodiment of the invention further provides a network-side device according to a sixth embodiment as illustrated in FIG. 13, and reference can be made to the particular implementation of the eNB in the third embodiment above for a particular implementation of the network-side device, so a repeated description thereof will be omitted here, and the network-side device generally includes:

A receiving component 1301 is configured to receive a D2D request message of a UE; and A processing component 1302 is configured to judge whether to accept the D2D request of the UE, and if so, to transmit the D2D request message to an MME, and to configure resource and instruct the UE to perform configuration of an accepted D2D feature returned by the MME upon reception of the accepted D2D feature; otherwise, to reject the D2D request of the UE, where the accepted D2D feature is acceptable one of D2D features requested by the D2D request message, which is determined by the MME according to the D2D request message.

Particularly the receiving component 1301 can be a transceiver capable of transmitting and receiving, and the processing component 1302 can be a processor, etc.

Particularly the processing component is configured to judge according to a current use condition of radio resources and interference strength whether to accept the D2D request of the UE.

Particularly the processing component is configured, when the D2D request of the UE is determined to be accepted and the accepted D2D feature returned by the MME is received, to allocate resource to be occupied for performing the accepted D2D feature or to release resource occupied by the accepted D2D feature.

Particularly the processing component is configured, after the resource is configured, to instruct the UE to activate the accepted D2D feature according to activation indication information carried in the D2D request message; or The processing component is configured, after the resource is configured, to instruct the UE to deactivate the accepted D2D feature according to deactivation indication information carried in the D2D request message.

Particularly the processing component is configured to receive an Initial Context Create Request message, transmitted by the MME, carrying the accepted D2D feature and to retrieve the accepted D2D feature; or to receive an S1-AP message, transmitted by the MME, carrying the accepted D2D feature and to retrieve the accepted D2D feature.

With the technical solutions above, in the embodiments of the invention, the UE transmits a D2D request message to the network side, and the MME determines acceptable one of D2D features requested by the UE and transmits the accepted D2D feature to the eNB, so that the MME controls the UE capable of proximity awareness; and The eNB judges whether the D2D request of the UE is acceptable before or after receiving the D2D feature returned by the MME, and judges according to a result of the judgment whether to reject the D2D request of the UE, and when the D2D request of the UE is acceptable, the eNB configures resource according to the accepted D2D feature returned by the MME and instructs the UE to perform configuration of the accepted D2D feature, so that the eNB controls the UE capable of proximity awareness.

In summary a UE capable of proximity awareness can be controlled in a network to which a D2D communication mechanism for a mutual discovery and even direct communication between mobile devices is introduced.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for controlling a User Equipment (UE), the method comprising:
   receiving, by a Mobility Management Entity (MME), a Device to Device (D2D) request message of a UE transmitted by an evolved Node B (eNB), determining, according to the D2D request message, requested D2D features, determining acceptable one of the requested D2D features and transmitting an accepted D2D feature to the eNB; and
   upon reception of the accepted D2D feature transmitted by the MME, judging, by the eNB, whether to accept the D2D request of the UE, and if the eNB determines to accept the D2D request, then configuring by the eNB, resource and instructing the UE to perform configuration of the accepted D2D feature; if the eNB determines not to accept the D2D request, rejecting, by the eNB, the D2D request of the UE.

2. The method according to claim 1, wherein determining, by the MME, the requested D2D features according to the D2D request message comprises:
   determining, by the MME, the D2D features requested by the UE according to D2D feature-related information carried in the D2D request message.

3. The method according to claim 2, wherein the requested D2D features comprise any one of:
   being capable of discovering another UE but incapable of being discovered by another UE;
   being capable of being discovered by another UE but incapable of discovering another UE; and
   being capable of discovering another UE and capable of being discovered by another UE.

4. The method according to claim 3, wherein the D2D feature-related information comprises any one of:
   indication information for indicating the D2D features;
   types of services for determining the D2D features; and
   D2D features.

5. The method according to claim 3, wherein determining, by the MME, the acceptable one of the requested D2D features comprises:
   determining, by the MME, a set of D2D features capable of serving the UE according to subscription data of the UE and a network policy; and
   determining, by the MME, one of the D2D features requested by the UE, which belongs to the set is the acceptable D2D feature.

6. The method according to claim 5, wherein transmitting, by the MME, the accepted D2D feature to the eNB comprises:

transmitting, by the MME, the accepted D2D feature to the eNB by carrying it in an Initial Context Create message; or transmitting, by the MME, the accepted D2D feature to the eNB by carrying it in an S1 interface application protocol layer (S 1-AP) message.

7. The method according to claim 1, wherein judging, by the eNB, whether to accept the D2D request of the UE comprises:

judging, by the eNB, according to a current use condition of radio resources and interference strength whether to accept the D2D request of the UE.

8. The method according to claim 7, wherein configuring, by the eNB, the resource comprises:

allocating, by the eNB, resource to be occupied for performing the D2D feature accepted by the MME or releasing resource occupied by the D2D feature accepted by the MME.

9. A network-side device, comprising:

a receiver configured to receive a Device to Device (D2D) request message of a User Equipment (UE) transmitted by an evolved Node B (eNB);

a processor configured to determine, according to the D2D request message, requested D2D features and to determine acceptable one of the requested D2D features; and a transmitter configured to transmit an accepted D2D feature to the eNB;

wherein the processor is configured to determine, according to subscription data of the UE and a network policy, a set of D2D features capable of serving the UE; and to determine one of the D2D features requested by the UE, which belongs to the set is the acceptable one of the requested D2D features.

10. The network-side device according to claim 9, wherein the processor is configured to determine the D2D features requested by the UE according to D2D feature-related information carried in the D2D request message.

11. A network-side device, comprising:

a transceiver configured to receive a Device to Device (D2D) request message of a User Equipment (UE), to transmit the D2D request message to a Mobility Management Entity (MME) and to receive an accepted D2D feature returned by the MME, wherein the MME determines, according to subscription data of the UE and a network policy, a set of D2D features capable of serving the UE, and determines one of D2D features requested by the UE, which belongs to the set is the accepted D2D feature; and a processor configured to judge, after the communicating component receives the accepted D2D feature, whether to accept the D2D request of the UE, and if the processor determines to accept the D2D request of the UE, to configure resource and instruct the UE to perform configuration of the accepted D2D feature; if the processor determines not to accept the D2D request of the UE, to reject the D2D request of the UE.

12. The network-side device according to claim 11, wherein the processor is configured to judge according to a current use condition of radio resources and interference strength whether to accept the request of the UE.

13. The network-side device according to claim 12, wherein the processor is configured, if the D2D request of the UE is accepted, to allocate resource to be occupied for performing the D2D feature accepted by the MME or to release resource occupied by the D2D feature accepted by the MME.

* * * * *